United States Patent
Alfoqaha et al.

(10) Patent No.: US 6,751,055 B1
(45) Date of Patent: Jun. 15, 2004

(54) INDUCTIVE TRANSDUCER WITH REDUCED POLE TIP PROTRUSION

(75) Inventors: Arshad Alfoqaha, San Jose, CA (US); Mohamad T. Krounbi, San Jose, CA (US); Sandrawattie Sankar, San Diego, CA (US); David J. Seagle, Morgan Hill, CA (US); Kenneth R. Young, San Jose, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 10/042,674

(22) Filed: Jan. 8, 2002

(51) Int. Cl.[7] .................................................. G11B 5/31
(52) U.S. Cl. ...................................................... 360/126
(58) Field of Search ................................. 360/126, 317

(56) References Cited

U.S. PATENT DOCUMENTS

| | | | | |
|---|---|---|---|---|
| 5,532,892 A | * | 7/1996 | Nix et al. .............. | 360/327.31 |
| 5,555,147 A | * | 9/1996 | Maruyama .............. | 360/317 |
| 5,828,533 A | * | 10/1998 | Ohashi et al. .......... | 360/126 |
| 6,104,576 A | * | 8/2000 | Santini ................ | 360/126 |
| 6,134,080 A | * | 10/2000 | Chang et al. ........... | 360/126 |
| 6,156,375 A | * | 12/2000 | Hu et al. .............. | 427/116 |
| 6,163,436 A | * | 12/2000 | Sasaki et al. .......... | 360/126 |
| 6,353,316 B1 | * | 3/2002 | Amano ................. | 324/252 |
| 6,430,003 B1 | * | 8/2002 | Sasaki ................ | 360/126 |
| 6,452,757 B1 | * | 9/2002 | Yang et al. ............ | 360/317 |
| 6,483,664 B2 | * | 11/2002 | Kamijima .............. | 360/126 |
| 6,501,618 B1 | * | 12/2002 | Kamijima et al. ....... | 360/126 |
| 6,538,845 B1 | * | 3/2003 | Watanabe et al. ....... | 360/126 |
| 6,583,954 B1 | * | 6/2003 | Sasaki ................ | 360/126 |

* cited by examiner

*Primary Examiner*—David Ometz
(74) *Attorney, Agent, or Firm*—Mark Lauer; Silicon Edge Law Group LLP

(57) ABSTRACT

An inductive transducer has inorganic nonferromagnetic material disposed in an apex region adjacent to a submicron nonferromagnetic gap in a magnetic core. The inorganic nonferromagnetic material has a much lower coefficient of thermal expansion than that of hardbaked photoresist, reducing pole tip protrusion even if other insulation surrounding the coil sections within the core is made of hardbaked photoresist. Alternatively, the entire insulation surrounding the coil sections within the core, in addition to the apex region, can be formed of inorganic nonferromagnetic material, further reducing pole tip protrusion. The transducer has $SiO_2$ rather than alumina in an undercoat layer joining the wafer substrate and the thin film layers of the transducer. $SiO_2$ may also replace alumina in other areas, such as a piggyback layer joining the inductive transducer with a magnetoresistive transducer.

16 Claims, 7 Drawing Sheets

INDUCTIVE TRANSDUCER WITH REDUCED POLE TIP PROTRUSION

BACKGROUND

The present invention relates to electromagnetic transducers, which may for example be employed in information storage systems or measurement and testing systems.

Conventional heads for reading or writing information on a media such as a disk or tape are formed in multiple thin film layers on a wafer substrate that is then divided into thousands of individual heads. An inductive transducer for such a head includes electrically conductive a coil sections encircled by a magnetic core including first and second pole layers, the core forming a magnetic circuit. Portions of the pole layers adjacent the media are termed pole tips. The magnetic core is interrupted by a submicron nonmagnetic gap disposed between the pole tips, so that the media bit closest to the gap becomes part of the magnetic circuit of the core and communicates magnetic flux between the pole tips and the media. To write to the media electric current is flowed through the coil, which produces magnetic flux in the core encircling the coil windings, part of the magnetic flux fringing across the nonmagnetic gap adjacent to the media so as to write bits of magnetic field information in tracks on the moving media.

A magnetoresistive (MR) sensor may be formed prior to the inductive transducer, the sensor sandwiched between soft magnetic shield layers. A first soft magnetic shield layer is conventionally formed on an alumina ($Al_2O_3$) undercoat that has been formed on an $Al_2O_3TiC$ wafer. The second shield layer may also serve as the first pole layer for a combined MR and inductive transducer that may be termed a merged head. A structure in which a second shield layer is separated from an adjacent first pole layer may be called a piggyback head.

Typically the first pole layer is substantially flat and the second pole layer is curved, as a part of the second pole layer is formed over the coil windings and surrounding insulation, while another part of the second pole layer nearly adjoins the first pole layer adjacent the gap. The second pole layer may also diverge from a flat plane by curving to meet the first pole layer in a region distal to the media-facing surface, sometimes termed the back gap region, although typically a nonmagnetic gap in the core does not exist at this location.

The throat height is the distance along the pole tips from the media-facing surface at which the first and second pole layers begin to diverge and are separated by more than the submicron nonmagnetic gap. The point at which the pole layers begin to diverge is called the zero throat height. Because less magnetic flux crosses the gap as the pole layers are further separated, a short throat height is desirable in obtaining a fringing field for writing to the media that is a significant fraction of the total flux crossing the gap. Typically the throat height is determined by the curve of the second pole layer away from the gap in an area termed the apex region. An angle at which the second pole layer diverges from the first at the zero throat height is termed the apex angle.

To form the curves in the second pole layer, an organic photoresist is deposited on and about the coil sections and then the wafer is cured to create sloping sides upon which the second pole layer is electroplated. Photoresist is typically employed at this stage due to the difficulty in uniformly filling regions between the coil sections and forming sloping sides in the apex region. Curing photoresist at an elevated temperature, which changes its consistency from gel to solid and can create such sloping sides, forms hardbaked photoresist. Hardbaked photoresist has a coefficient of thermal expansion that is higher than that of other materials used to form the head, and so resistive heating in the coil sections can cause the area within the pole layers to expand, resulting in protrusion of the pole tips.

Most of the soft magnetic material in a conventional head is formed of permalloy ($Ni_{0.8}Fe_{0.2}$) and most of the dielectric material, aside from the baked photoresist around the coils, is formed of alumina. Alumina, as well as the AlTiC wafer that is conventionally employed for making heads, may have been selected for use with permalloy due to substantially similar thermal expansion coefficients. Having matching thermal expansion coefficients reduces problems such as strain and cracks between layers that expand or contract by different amounts.

Current commercially available disk drive heads "fly" at a separation of less than a microinch (about 25 nanometers) from a rigid disk that may be spinning at 10,000 revolutions per minute. Thus, even a small protrusion caused by the resistive heating of the coil could result in a crash that destroys the head and/or disk and renders irretrievable any data stored on the disk. Even without a crash, contact with the disk could move the head off track, causing data errors. Alternatively, avoiding a crash or data errors may require increasing the separation of the sensor from the disk, substantially decreasing the resolution.

SUMMARY

In accordance with the present invention, an inductive transducer is disclosed having inorganic nonferromagnetic material disposed in an apex region adjacent to a submicron nonferromagnetic gap in the core. The inorganic nonferromagnetic material has a much lower coefficient of thermal expansion than that of hardbaked photoresist, and significantly reduces pole tip protrusion even for the situation in which a much larger amount of insulation surrounding the coil sections within the core is made of hardbaked photoresist. Alternatively, the entire insulation surrounding the coil sections within the core, in addition to the apex region, can be formed of inorganic nonferromagnetic material, further reducing pole tip protrusion.

Also in accordance with the present invention, a transducer is disclosed having silicon dioxide ($SiO_2$) rather than alumina in an undercoat layer that joins the wafer substrate and the thin film layers of the transducer. It has been discovered that thermal expansion of the undercoat may be magnified at the pole tips by the distance between the undercoat and the pole tips. Silicon dioxide has lower coefficient of thermal expansion than that of alumina and so reducing the thermal expansion of the undercoat can provide a magnified reduction in pole tip protrusion. Silicon dioxide may also replace alumina in other areas, for example in a piggyback layer joining an inductive transducer and a magnetoresistive transducer.

DETAILED DESCRIPTION OF THE PREFERRED EMBODIMENTS

Figure 1:
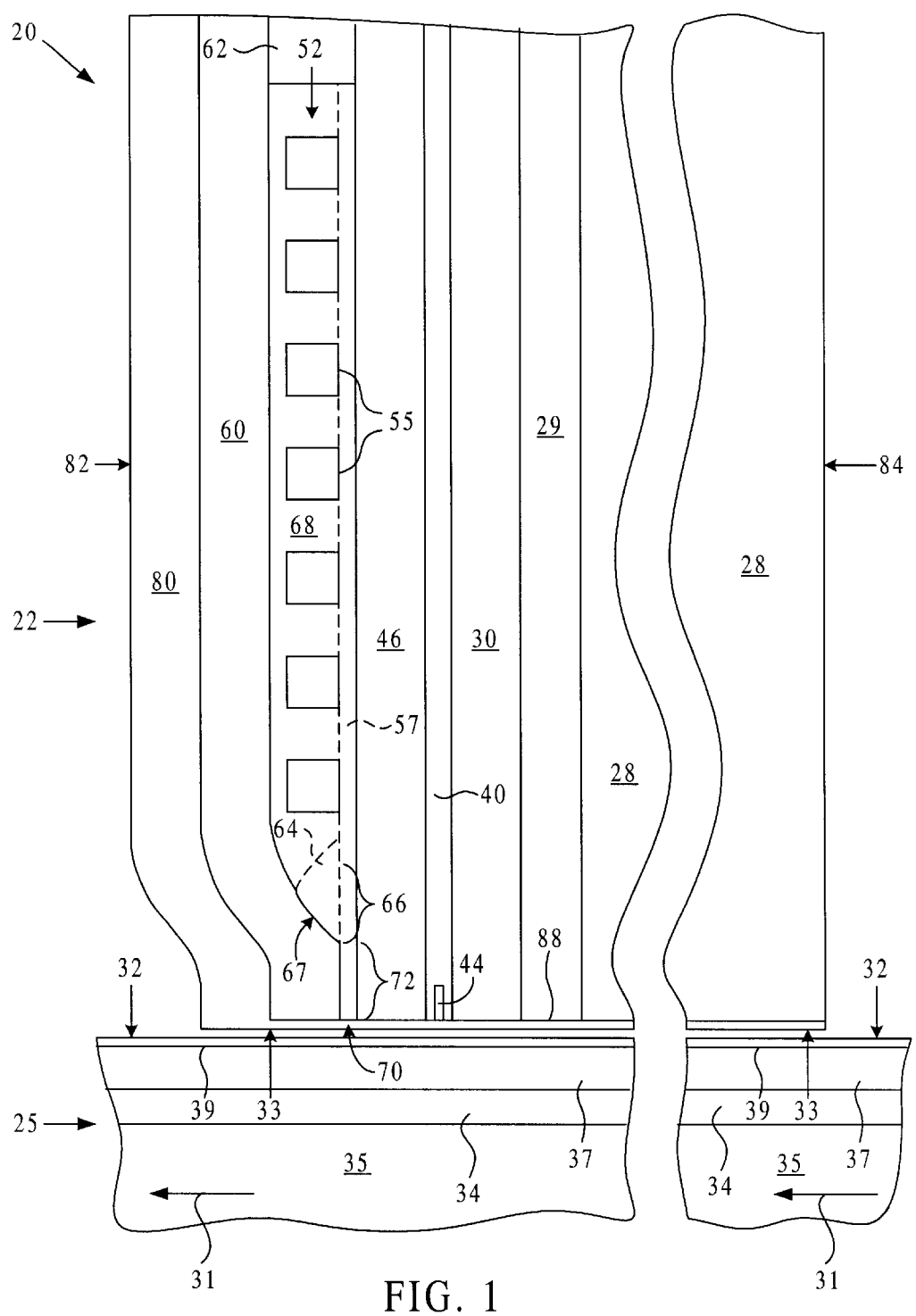
FIG. 1 is a cutaway cross-sectional view of a portion of an information storage system in accordance with a first embodiment of the present invention.

FIG. 1 depicts a cutaway cross-section of a portion of an information storage system 20 in accordance with an embodiment of the present invention. Portions of an electromagnetic head including a merged inductive and MR transducer 22 are depicted in close proximity to a relatively moving media such as a spinning disk 25. The transducer 22 is formed in a plurality of adjoining solid layers on a wafer substrate 28 that may remain affixed to the transducer 22. In this case, the substrate 28 is so much larger than the transducer 22 that a leading end 84 of the head is shown cut away from a trailing end 82. A media-facing surface 33 of the solid body that includes the transducer 22 may be formed with a desired relief for fluid and solid interaction with the disk 25, and the body may be termed a head or slider.

The disk 25 may be conventional and includes a self-supporting substrate 35, an underlayer 34, a media layer 37 and a protective overcoat 39. The disk 25 is spinning in a direction indicated by arrow 31 and has a surface 32 adjacent the media-facing surface 33 of the head. The disk, which is much larger than the head, is also shown in FIG. 1 cut into two portions.

Atop the slider substrate 28 an undercoat layer 29 of $SiO_2$ or SiC is formed by sputtering or other low-pressure deposition processes, and then polished to a thickness of several (typically 2–6) microns (um). Formation of an undercoat layer 29 of silicon dioxide or silicon carbide rather than conventional alumina can result in a significant reduction in pole tip protrusion, even if no other changes to the head are made. This effect is also described in an article entitled "On the Thermal Behavior of Giant Magnetoresistive Heads," by B. K. Gupta et al., Transactions of the ASME, Vol. 123, April 2001, pp. 380–387, which is incorporated herein by reference. Alternatively, an alumina undercoat can be formed to have a reduced but nonzero thickness (in a range between three and four microns for current state of the art commercially available heads) to reduce pole tip protrusion.

A low-coercivity, high-permeability or "soft magnetic" shield layer 30 has been formed atop the undercoat 29, the shield layer 30 made for example of permalloy. A first layer of nonferromagnetic, electrically insulating material has been formed on the shield layer 30, followed by a magnetoresistive (MR) sensor 44. The MR sensor 44 can be any sensor that utilizes a change in resistance associated with a change in magnetic field to sense that field, which may be measured as a change in current or voltage across the sensor, including anisotropic magnetoresistive (AMR) sensors, spin-valve (SV) sensors, spin-tunneling (ST) sensors, giant magnetoresistive (GMR) sensors and colossal magnetoresistive (CMR) sensors.

A second layer of nonferromagnetic, electrically insulating material has been formed between the MR sensor and a second soft magnetic shield layer 46, which also serves as a first pole layer 46 in this example of a merged head. The first and second layers of nonferromagnetic, electrically insulating material are indicated together as region 40 and may be made, for example, of $Al_2O_3$, $SiO_2$, AlN, or various forms of carbon-containing material, such as silicon carbide (SiC), diamond-like carbon (DLC) or tetrahedral amorphous carbon (ta-C).

An electrically conductive coil layer 52 has coil sections 55 that are separated from the shield/pole layer 46 by recording gap layer 57, which may in this embodiment be formed of dielectric material such as $Al_2O_3$, $SiO_2$, AlN, SiC, DLC or ta-C. Inorganic nonferromagnetic material 64 having a coefficient of thermal expansion substantially less than that of hardbaked photoresist is formed in an apex region 66. The term inorganic material in the present application refers to a material that is lacking carbon polymer chains. Such inorganic material 64 can be formed of dielectrics such as $SiO_2$, SiC, $Al_2O_3$, $Si_3N_4$, TiC, AlN or metals such as Ta, W, Al, Ti, Au, Ni, Pd, Pt, Cr or NiCr. The apex region 66 has a trailing surface 67 that is angled compared to the first pole layer 46, such that along surface 67 an increase in distance from the leading end 84 corresponds to an increase in distance from the media-facing surface 33. The angle of the trailing surface 67 compared to a normal to the media-facing surface may range between about 15° and about 75° in this embodiment.

Silicon carbide has a coefficient of thermal expansion at normal operating temperatures that is less than one-half that of alumina, and silicon dioxide has a coefficient of thermal expansion that is about one-seventh that of alumina. Moreover, alumina has a coefficient of thermal expansion that is about one-thirteenth that of hardbaked photoresist, tantalum has a coefficient of thermal expansion that is less than one-eighth that of hardbaked photoresist, silicon carbide has a coefficient of thermal expansion that is less than one-tenth that of hardbaked photoresist, and silicon dioxide has a coefficient of thermal expansion that is aboutless one-hundredth that of hardbaked photoresist.

Hardbaked photoresist 68 is disposed in a region between, around and atop coil sections 55. A second soft magnetic pole layer 60 is coupled to the first pole layer 46 by a soft magnetic stud 62. A submicron, nonferromagnetic gap 70 separates pole layers 46 and 60 adjacent to the media-facing surface 33, the gap extending away from that surface 33 along a throat 72, with the separation between pole layers 46 and 60 widening in the apex region 66. A protective coating 80 is formed on a trailing edge 82 of the body, while another protective coating 88 is formed on the media-facing surface 33.

Formation of the inorganic nonferromagnetic material 64 in apex region 66 may be accomplished with various deposition and removal techniques. Each of these methods are also described in the U.S. Patent Application filed concurrently herewith, by Express Mail Label No. EL928366006US, inventors Xiaozhong Dang et al., entitled "Method of Making Transducer with Inorganic Nonferroelectric Apex Region," which is incorporated herein by reference.

For example, a layer of the material 64 can be formed on a recording gap layer 57 of different material, after which a mask is formed over the apex region 66. An isotropic etch can then be performed with a chemical that removes the material 64 but not the material of recording gap layer 57, the etch terminated when all of the material 64 has been removed except for a mound or ridge 64 that is to remain in apex region 66.

As another example, a lift-off mask can be formed on the recording gap layer 57 to have an opening over apex region 66. Inorganic nonferromagnetic material such as $Al_2O_3$, $SiO_2$, AlN, SiC, DLC, $Si_3N_4$, Ta, Ti, TiC or Cr can then be sputtered onto the mask and through the opening in apex region 66 and onto the recording gap layer. The mask, which may include plural layers for controlling the slope of the sides of the material formed in apex region 66 as well as for ease in mask removal, is then chemically removed and the sputtered material atop the mask lifted off, leaving a pyramid, ridge or wedge 64.

Alternatively, a layer of inorganic nonferromagnetic material 64 can be formed on a recording gap layer 57 of different material, after which a photoresist mask is formed over the apex region 66. The photoresist mask is then cured to create a hardbaked mask having sides with a slope similar to that desired for the apex region 66. An anisotropic etch such as RIE or IBE is then directed substantially perpendicular to the wafer surface, forming material 64 into a replica of the baked mask in apex region 66. Although recording gap layer 57 is shown as extending between the material 64 in apex region 66 and shield/pole layer 46, the material 64 may instead adjoin that layer 46, with another nonferromagnetic layer forming a submicron recording gap separate from layer 57.

After formation of the inorganic nonferromagnetic material 64 in apex region 66, the coil layer can be formed by seeding, forming a coil mask and electroplating through the mask, after which the seed layer can be removed by IBE or RIE. A similar electroplating process can be used to form soft magnetic stud 62. Photoresist 68 can then be deposited between the coil sections 55 and cured to form baked photoresist insulation 68. The second pole layer 60 can then be formed atop the gap 70, apex region 66, baked photoresist 68 and stud 62 by seeding and electroplating permalloy, for example.

Although baked photoresist has only been replaced with inorganic dielectric material 64 in apex region 66, while a much larger amount of baked photoresist 68 remains in and about the coil sections 55 in the embodiment of FIG. 1, a reduction of pole tip protrusion of several nanometers has been achieved. Since the average separation between the disk and head during operation may be twenty nanometers or less, this achievement provides a significant reduction in the problem of pole tip protrusion. The use of photoresist 68 to fill regions between the coil sections 55 can be advantageous especially for the case in which separations between coil sections 55 are narrow, in which case other materials may leave unfilled pockets that may expand more than hardbaked photoresist upon heating, as well as potentially causing other problems. Thus, for the situation in which the apex region 66 is formed of inorganic material 64 and the remainder of coil insulation is formed of hardbaked photoresist 68, significant reduction in pole tip protrusion is accomplished, perhaps because the ceramic apex region 66 constrains expansion of the hardbaked photoresist.

Further reduction in pole tip protrusion may be accomplished, for example, by filling at least portions of the regions between the coil sections 55 with photoresist, and then depositing inorganic dielectric such as silicon dioxide onto the coil sections 55 and into any spaces between the coil sections 55. The photoresist can be spun and cured to fill the regions between the coil sections 55 without remaining atop the coil sections 55. Encircling the baked photoresist between the coil sections 55 with relatively hard inorganic material having a lower coefficient of thermal expansion than the photoresist may further constrain expansion of the photoresist. Additional reduction in pole tip protrusion is achieved in this case due to the substitution of the photoresist with the less thermally expansive material.

Figure 2:
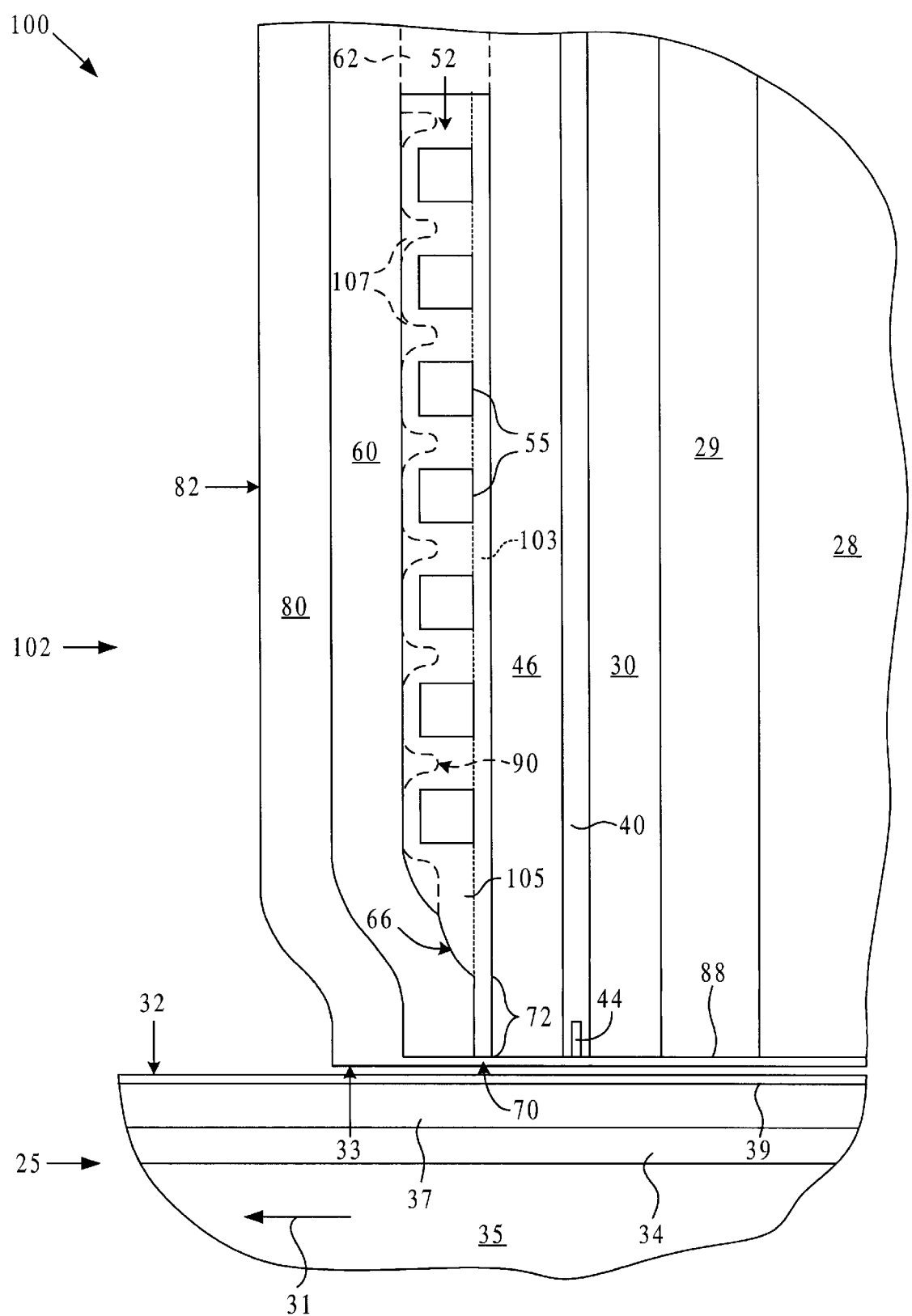
FIG. 2 is a cutaway cross-sectional view of a portion of an information storage system in accordance with a second embodiment of the present invention.

FIG. 2 shows an information storage system 100 with a transducer 102 in which the apex region 66 and insulation surrounding coil sections 55 are formed of inorganic dielectric material 105 having a lower coefficient of thermal expansion than baked photoresist, such as alumina or silicon dioxide. A tapered apex region 66 can be formed of inorganic material 105 shaped by a lift-off process or chemical etching, as described above. In either case, additional insulation material can be formed of baked photoresist or additional inorganic insulation.

Briefly, to form the inorganic apex region 66 shown in FIG. 2, the transducer 102 may partially completed by conventional means (aside from forming the novel undercoat layer 29 of $SiO_2$), including forming the shield/pole layer 46 of permalloy having a thickness of a few microns or less. A submicron nonferromagnetic gap layer 103 may then be formed on the shield/pole layer 46 to a thickness that may be in a range between 50 nanometers (nm) and 500 nm. The coil layer 52 may then be formed by sputtering a conductive seed layer, forming a photoresist with a spiral void through which the coil is electroplated, chemically removing the resist and removing the seed by ion beam etching (IBE), reactive ion etching or the like.

A lift-off mask (preferably bi-layer) may then be formed over the throat area 72 and inorganic dielectric such as silicon dioxide is sputtered over and between the coil sections 55. After the mask has been chemically removed a sloping side to apex region 66 remains and, depending upon the thickness of sputtered dielectric 45, a surface 90 may result that in some places does not extend above the coil sections 55 in areas between the coil sections 55. It is also possible to remove some of first pole layer 46 by IBE prior to sputtering inorganic dielectric over and between the coil sections 55. For the situation in which the inorganic dielectric does not extend above the coil sections 55 and instead leaves depressions 90 in regions between the coil sections 55, a photoresist mask can be formed over the coil sections, the photoresist mask then spun to fill in the depressions and cured to form baked photoresist filler 107.

Alternatively, layer of inorganic dielectric such as silicon dioxide can be sputtered over and between the coil sections 55, and then polished to form a flat surface above the coil sections 55. A mask can then be formed over coil sections 55, the mask terminating above throat 72. Next, an isotropic etch can be performed with a chemical that removes the inorganic dielectric but not recording gap layer 103, the etch terminated when all of the inorganic dielectric has been removed above throat 72, creating a sloping apex region 66 that leads to the thicker inorganic dielectric layer remaining between and above coil sections 55. In any event, the apex region 66 provides for smoothly increasing the separation of the first and second pole layers from less than a micron to greater than a micron as said pole layers extend from the media-facing surface 33.

Figure 3:
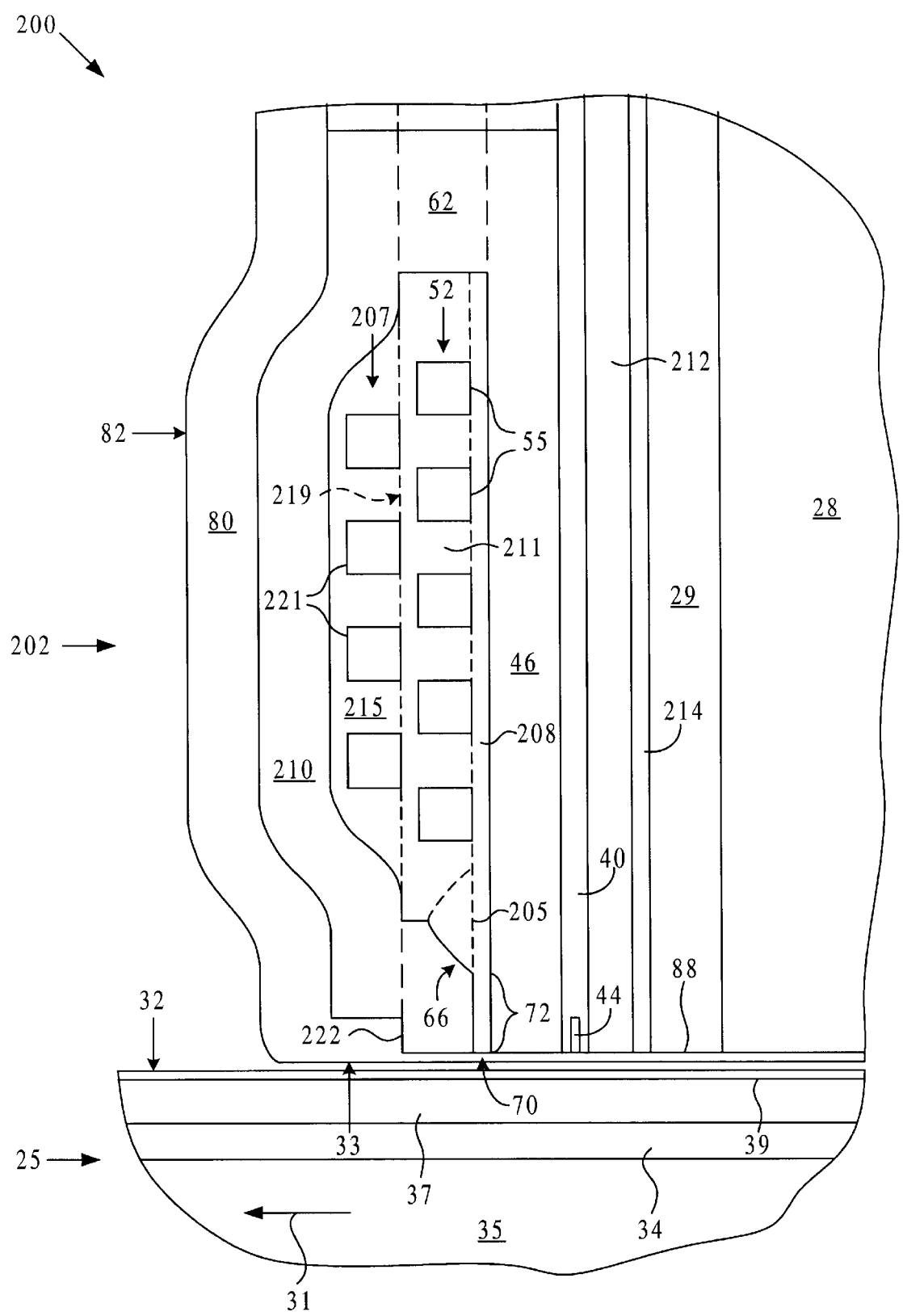
FIG. 3 is a cutaway cross-sectional view of a portion of an information storage system in accordance with a third embodiment of the present invention.

FIG. 3 shows an information storage system 200 with a transducer 202 having a second coil layer 207 and a stitched second pole layer 210. Shield layer 29 is formed of silicon dioxide and has a thickness of between two and four microns. In addition, transducer 200 has a first shield layer 212 that is much thinner than merged shield/pole layer 46. In place of some of the first shield layer, silicon dioxide or other dielectric having a lower thermal expansion coefficient than permalloy may be formed. For example, a layer 214 of silicon carbide may be formed between shield layer 212, silicon carbide affording greater thermal conductivity and lower thermal expansion than alumina. Similar to previous embodiments, a nonferromagnetic insulating gap layer 208 has been formed, on which the apex region 66 is formed of inorganic material 205 that has a lower coefficient of thermal expansion than that of baked photoresist, such as alumina or silicon dioxide.

The tapered apex region 66 can be formed of inorganic nonferromagnetic material 205 shaped by a lift-off process, chemical etching or replication etching, as described above. Alternatively, the transducer can be formed as described in U.S. patent application Serial No. 09/999,694, filed Oct. 24, 2001, inventors Yingjian Chen et al., entitled "Inductive Transducer with Stitched Pole Tip and Pedestal Defining Zero Throat Height," which is incorporated herein by reference. For the case in which inorganic nonferromagnetic material 205 is formed separately from insulation between and around coil sections 55, that insulation can be formed on and around coil sections 55 of baked photoresist and/or inorganic material. Atop the apex and insulation material a magnetic layer can be seeded and plated, the magnetic layer and additional insulation material then polished to form surface 219 and a second pole layer 222 including a trailing pole tip.

Second coil layer 207 can then be formed including coil sections 221, and additional insulation 215 can be formed partly or wholly of organic or inorganic material, as described above. Atop insulation 215, second pole layer 222 and magnetic stud 62, a third pole layer 210 can then be formed. In this embodiment as well as others, providing a relatively thick (e.g., 20–40 micron) coating 80 on the trailing end 82 can be advantageous in constraining pole tip protrusion.

It has also been discovered that for a given head configuration and size a certain undercoat 29 thickness provides a minimum of pole tip protrusion. This minimum appears to result from the interaction of two competing phenomena. First, as the undercoat 29 is made thinner, first shield layer 30 becomes more constrained by the substrate 28, which has a lower coefficient of thermal expansion, lowering the pole tip protrusion. As the undercoat 29 is made thinner, the layers above first shield layer 30 are constrained similar to but proportionally less than first shield layer 30. This tends to decrease the contribution of second shield and first pole layer 46 to the pole tip protrusion. As the constraint described above increases, however, a second countervailing condition becomes apparent at small undercoat 29 thicknesses. The relatively rigid second pole layer 60 and overcoat layer 80 region near the media-facing surface 33 pivots about the write gap 70 due to expansion of hardbaked photoresist about the coil sections 55, so that the trailing end 82 of the head protrudes toward the disk surface 32. The first condition tends to dominate for undercoat 29 thicknesses greater than a few microns. The second condition tends to dominate for undercoat 29 thicknesses less than a few microns. Hence there can be a minimum in pole tip protrusion for an undercoat 29 thickness that is small but nonzero, e.g., 2–4 microns.

Figure 4:
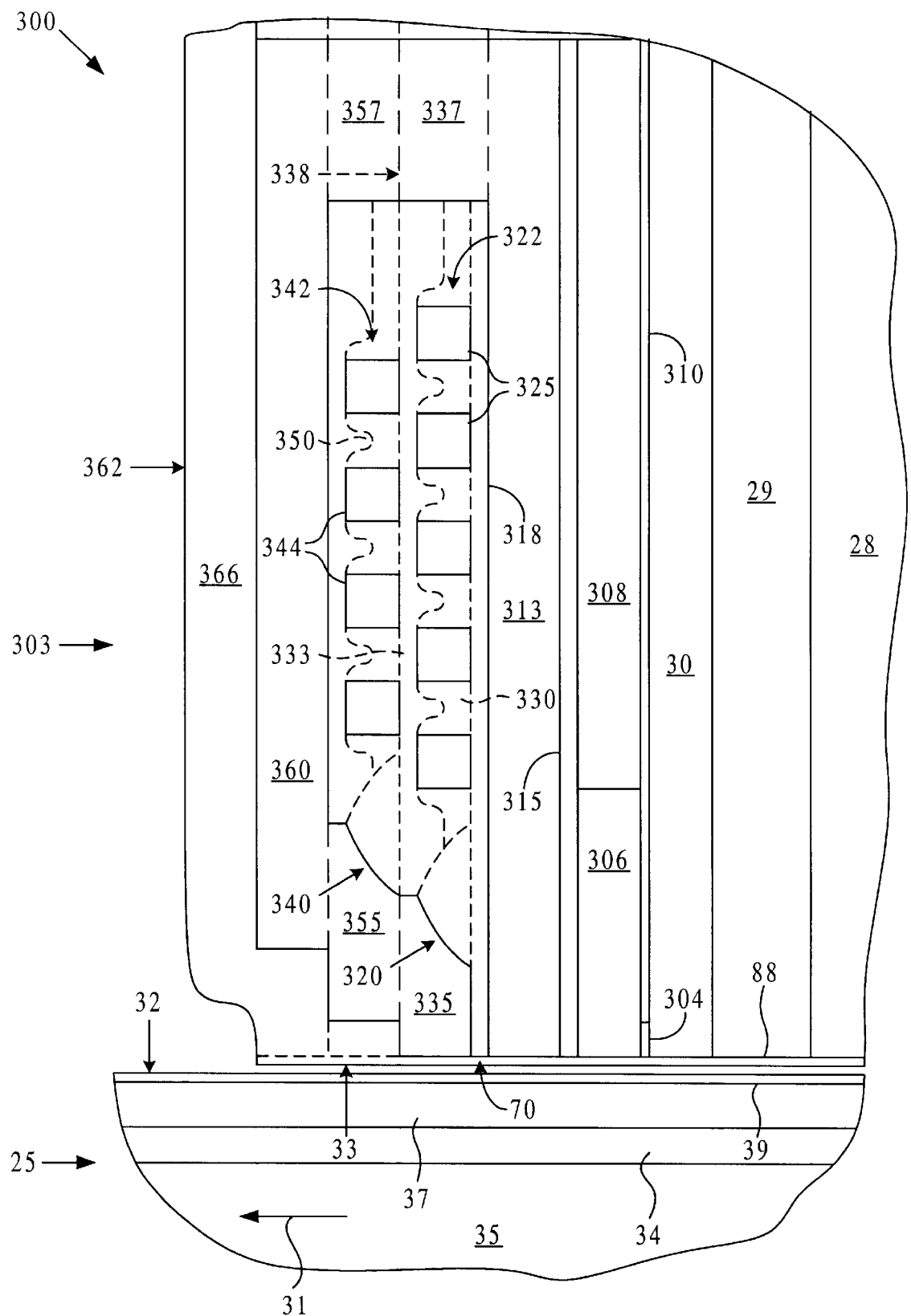
FIG. 4 is a cutaway cross-sectional view of portion of an information storage system in accordance with a fourth embodiment of the present invention.

FIG. 4 shows an information storage system 300 having a piggyback head 303 in accordance with the present invention. This embodiment includes several novel features that may be used individually, or in the combination shown, or combined with other features described and depicted in other embodiments. On the wafer substrate 28, a portion of which is included in this head 303, an undercoat layer 29 of silicon dioxide has been formed to a thickness of about three microns.

The embodiment shown in FIG. 4 also includes a spin-dependent tunneling sensor 304 that may alternatively be used in other embodiments. A second shield layer 306 has been formed adjacent the sensor 304, the second shield layer 306 extending from the media-facing surface 33 much less than the first shield 30 or a first pole layer 313. A back shield layer 308 is formed of a material having a lower coefficient of thermal expansion than permalloy, such as silicon dioxide or other insulator, conductor or semiconductor materials, which may include Ta, Pd, Pt, or $Al_2O_3$, for example. A read gap insulator layer 310 such as silicon dioxide separates the first shield 30 from the second shield layer 306 and the back shield layer 308.

The first pole layer 313 is separated from the second shield layer 306 and the back shield layer 308 in this embodiment by a piggyback gap layer 315. The piggyback gap layer 315 is formed of silicon dioxide rather than conventional alumina, this substitution by itself providing a measurable decrease in pole tip protrusion of a few nanometers.

A submicron, nonferromagnetic write gap layer 318 is formed on the first pole layer 315, the write gap layer 318 formed of dielectric material such as alumina or silicon carbide, or conductive material such as Ta, Pd, Pt, NiCr or NiFeCr. An inorganic apex region 320 has been formed by etching, lift-off deposition or replication etching as described above, after which a first coil layer 322, including coil sections 325, has been formed. A layer of baked photoresist 330 fills the area between coil sections 325, and an inorganic dielectric material layer 333 is disposed atop the photoresist 330. A second pole layer 335 including a trailing pole tip as well as a back gap stud 337 have been formed of soft magnetic material and polished along with the inorganic dielectric material layer 333 to form a flat surface 338. The photoresist 330 provides thorough coverage in the corners between the coil sections 325, whereas the inorganic dielectric material 333 constrains the thermal expansion of the photoresist 330.

Atop surface 338 another inorganic region 340 has been formed by etching or lift-off deposition as described above, after which a second coil layer 342, including coil sections 344, has been formed. A layer of baked photoresist 350 fills the area between coil sections 344, and an inorganic dielectric material layer 353 is disposed atop the photoresist 330. A stitch pole layer 355 as well as another back gap stud 357 have been formed of soft magnetic material and polished along with the inorganic dielectric material layer 333 to form another flat surface. A trailing pole layer 360 of soft magnetic material is then formed, followed by a thick (e.g., 20 um–40 um) coating layer 366 on a trailing end 362. After the wafer substrate 28 has been divided into rows a much thinner protective coating 370 has been formed on the media-facing surface 33, and the rows divided into individual heads such as head 300.

Figure 5:
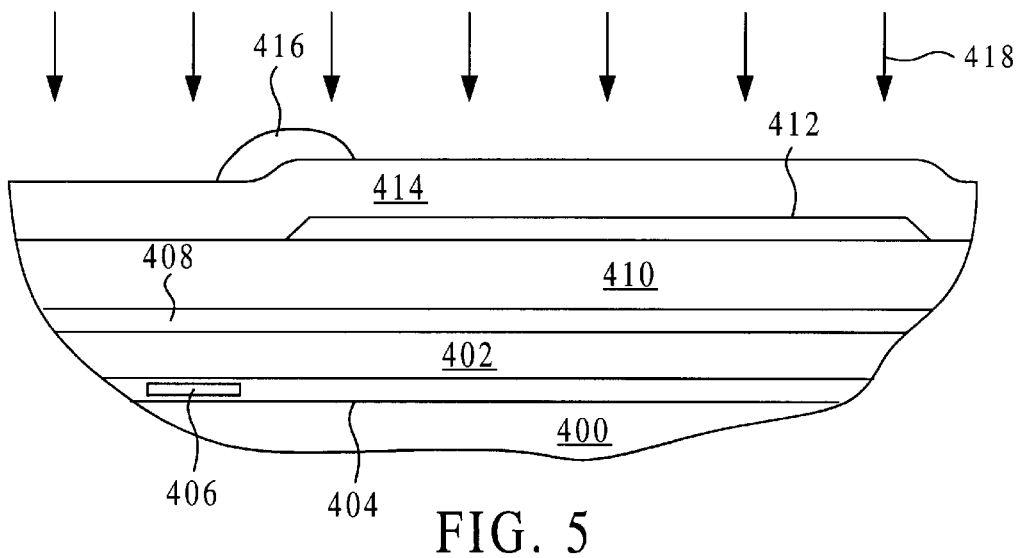
FIG. 5 is a step in making an embodiment of the present invention having an inorganic nonferromagnetic apex region.

FIG. 5 shows a step in making an embodiment of the present invention having an inorganic nonferromagnetic apex region. A first shield layer 400 is insulated from a second shield layer 402 by inorganic dielectric layer 404, with an MR sensor 406 also disposed between the first and second shield layers. A first pole layer 410 is spaced apart from second shield layer 402 by a silicon dioxide piggyback layer 408. Atop the fist pole layer an inorganic dielectric layer 412 has been formed, for example by sputtering alumina to a thickness of one-quarter micron though a mask that has been lifted off to leave the layer 412 shown. A layer 414 of inorganic nonferromagnetic material such as silicon dioxide or tantalum has been formed on the first pole layer 410 and dielectric layer 412. Layer 414 may be formed by physical vapor deposition (PVD) such as sputtering, plasma enhanced chemical vapor deposition (PECVD) or other known techniques.

A replication mask 416 of baked photoresist has been formed into a desired shape for creating an apex region from layer 414. Since mask 416 is made of baked photoresist it can be easily formed by photolithography and curing into the desired shape. An ion-assisted etch is then performed in the direction of arrows 418, for example by RIE with at least partially ionized gases of $O_2$ and $CHF_3$, $O_2$ and $CF_4$ or $O_2$ and $CF_4$. The baked photoresist has a similar rate of removal during ion-assisted etching as the inorganic nonferromagnetic material of layer 414, so that the shape of replication mask 416 is transferred to layer 414 to create apex region 420 shown in FIG. 6.

The RIE is designed to be highly selective between silicon dioxide and alumina or tantalum, with an etch rate selectivity of about ten or twenty for silicon dioxide to alumina, for example. In other words, the silicon dioxide is removed by the RIE at a rate about ten to twenty times as fast as the rate of removal of alumina. Nickel iron is etched even slower by the RIE, because nickel iron does not react with the etch chemicals, but may experience slight removal due to ion impingement. Thus, both layer 410 and layer 412 can serve as etch stops for the RIE. Optical measurement and monitoring can be used to indicate completion of the RIE.

Figure 6:
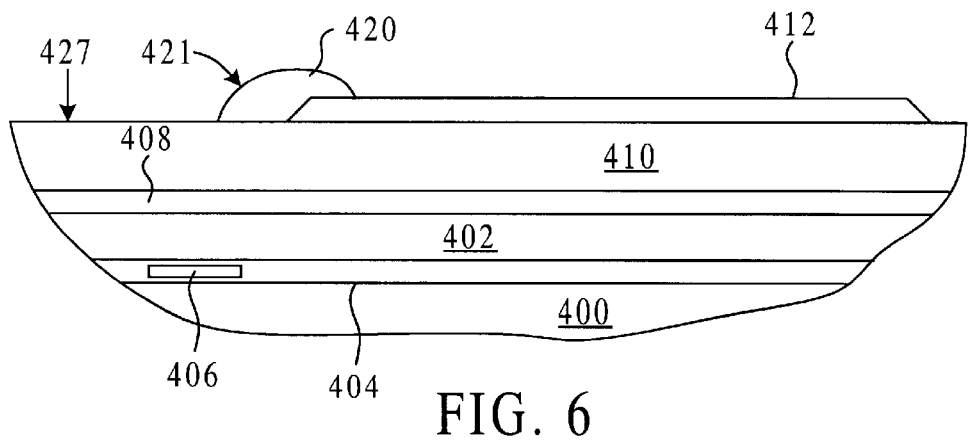
FIG. 6 is a step in making the embodiment of FIG. 5 subsequent to the step shown in FIG. 5.

FIG. 6 shows just one example of an inorganic nonferromagnetic apex shape 420 that can be formed with this mask transfer process. Note that the inorganic nonferromagnetic apex region 420 has a sloping side 421 that is neither parallel nor perpendicular to a surface 427 of first pole layer 410.

Figure 7:
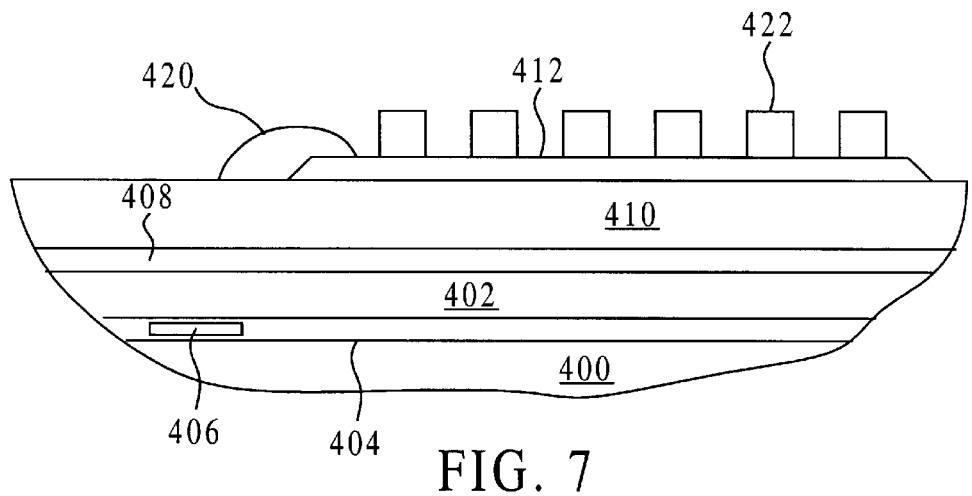
FIG. 7 is a step in making the embodiment of FIG. 5 and FIG. 6 subsequent to the step shown in FIG. 6.

FIG. 7 shows a set of coil sections 422 formed on inorganic dielectric layer 412 as part of a coil layer, for example by electroplating through a photoresist mask that is removed to allow IBE of the seed layer for the coil layer.

Figure 8:
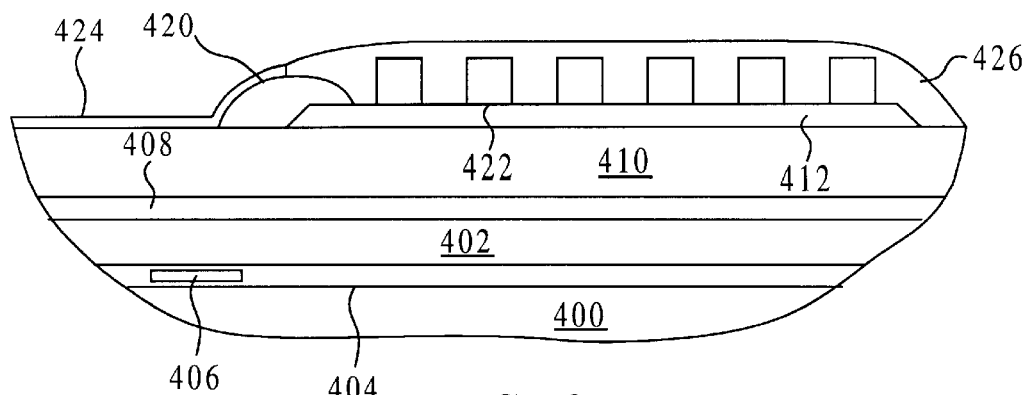
FIG. 8 is a step in making the embodiment of FIG. 5, FIG. 6 and FIG. 7 subsequent to the step shown in FIG. 7.

In FIG. 8, a recording gap layer 424 of inorganic nonferromagnetic material has been formed on first pole layer 410 and apex bump 420. A layer of photoresist 426 has been deposited and cured between and atop coil sections 422. A second pole layer can then be formed, as described above. Although FIG. 8 shows baked photoresist 426 between the coil sections 422, this insulation can instead or in addition be made with inorganic materials, as described above.

Figure 9:
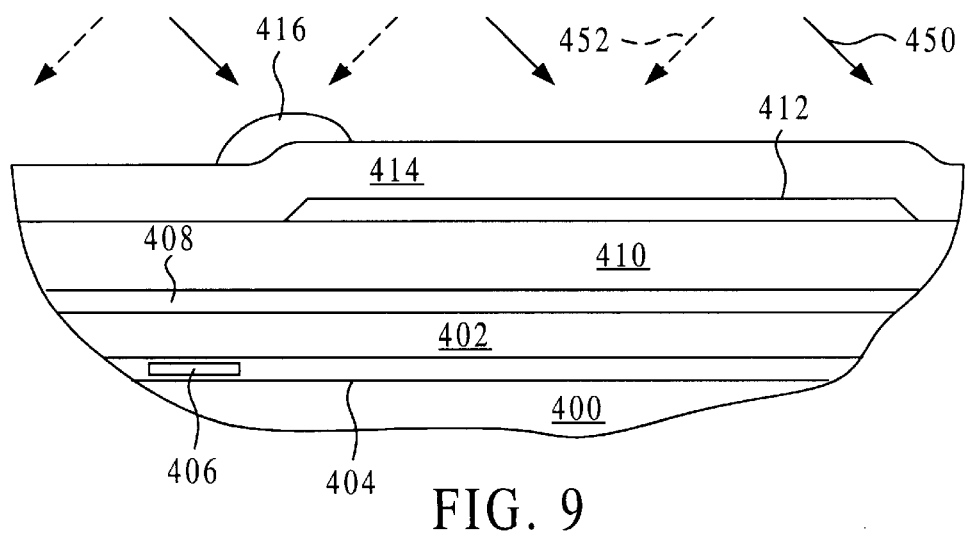
FIG. 9 is a step in making another embodiment of the present invention having an inorganic nonferromagnetic apex region.
Figure 10:
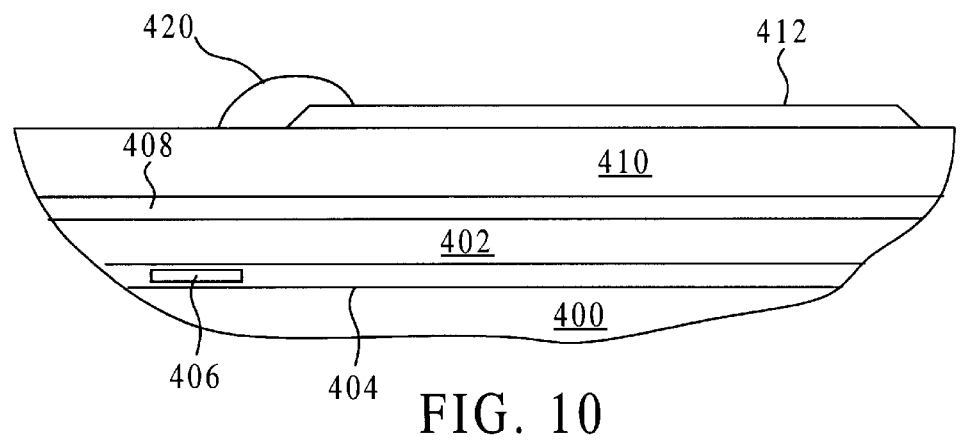
FIG. 10 is a step in making the embodiment of FIG. 9 subsequent to the step shown in FIG. 10.

FIG. 9 shows a step in forming an inorganic nonferromagnetic apex region with IBE. In this case, because chemical etch rate selectivity is not a factor, layers 412 and 414 can be composed of a wider variety of materials than those for RIE processes. Inorganic dielectric layer 412 can be made of AlN, $Si_3N_4$, SiC or $SiO_2$, for example. Inorganic nonferromagnetic layer 414 can be made of those dielectric materials or metals such as Cr, Au, Cu, Ta, Pt, Pd and their alloys, e.g., NiCr. The IBE, which may be called ion milling, may be performed with Ar ions at a fixed, sweeping or rotating angle to the wafer surface.

In the embodiment shown in FIG. 9, the ions are directed at an angle that is approximately 45° to the wafer surface, the angle rotating at approximately 45° about a normal to that surface. That is at one time the ions are directed at an angle shown by arrows 450, and at a later time the ions are directed at an angle shown by arrows 452. Such an angled IBE homogenizes the etch rate of various materials. For example, an IBE etch rate of silicon dioxide is about half that of baked photoresist for an IBE directed perpendicular to the wafer surface, but about equal to that of baked photoresist for an etch directed at 45° to perpendicular. An IBE etch rate of alumina is close to that of baked photoresist for an IBE directed perpendicular to the wafer surface, and essentially identical to that of baked photoresist for an etch directed at 45° to perpendicular. Termination of etching may be assisted by monitoring gases discharged from the etching chamber for the presence of chemicals from layers 412 or 414 to indicate completion of the IBE.

Note that for both the IBE and RIE processes, the replication mask need not have an identical shape to that desired for the apex bump, but instead the mask shape and etching process can compensate for each other to yield a desired apex bump. Note also that various other shapes can be made with such a mask transfer processes.

Figure 11:
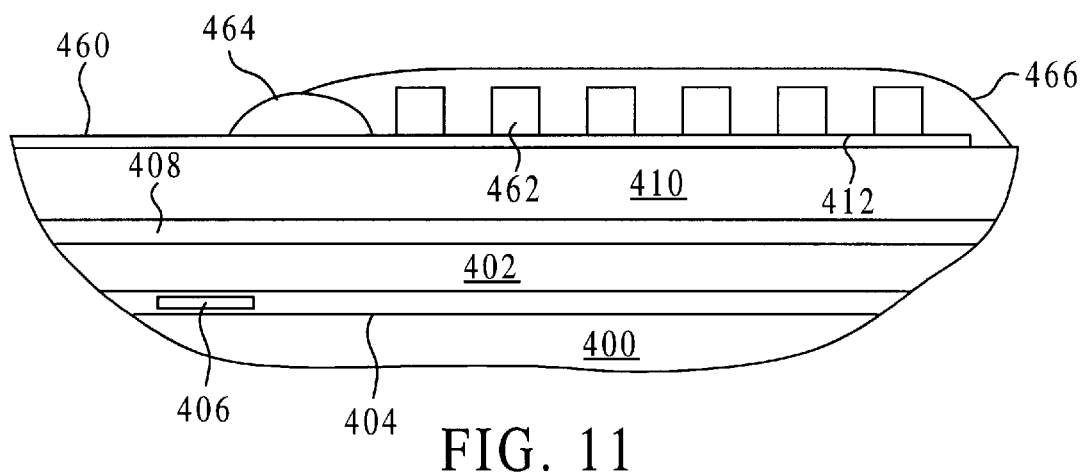
FIG. 11 is a step in making another embodiment of the present invention having an inorganic nonferromagnetic apex region.

Several other embodiments can also be made in accordance with the present invention. For example, in FIG. 11, a dielectric submicron gap layer 460 has been formed prior to an inorganic nonferromagnetic layer that has been etched after being covered with a transfer mask to form an inorganic nonferromagnetic apex region 464. Hardbaked photoresist 466 has been formed between and atop coil sections 462 in this example.

Figure 12:
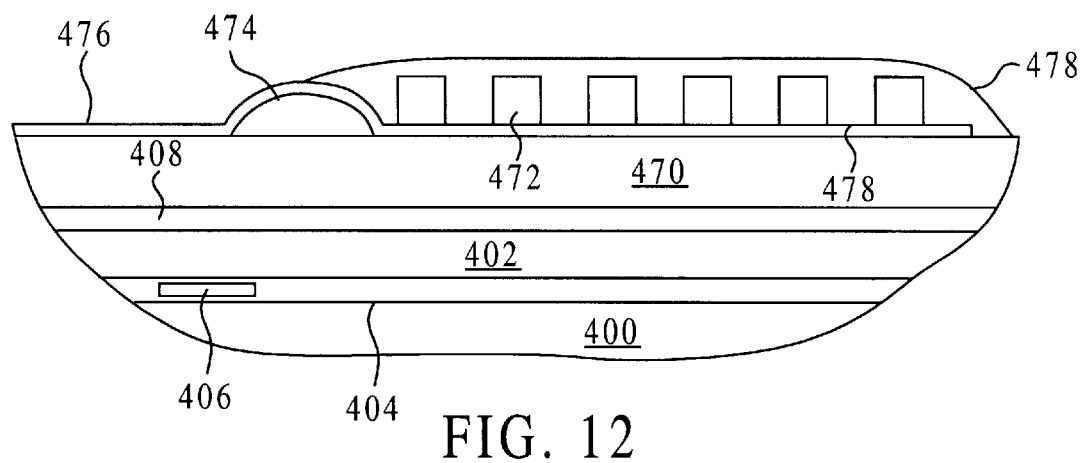
FIG. 12 is a step in making another embodiment of the present invention having an inorganic nonferromagnetic apex region.

FIG. 12 shows an alternative embodiment in which an inorganic nonferromagnetic layer has been formed on a first pole layer 470, covered with a transfer mask, and etched to form an inorganic nonferromagnetic apex region 474. An inorganic dielectric layer 476 has been formed atop apex region 474 and first pole 470, after which coil sections 472 were formed. Hardbaked photoresist 478 has also been formed between and atop coil sections 472 in this example.

Figure 13:
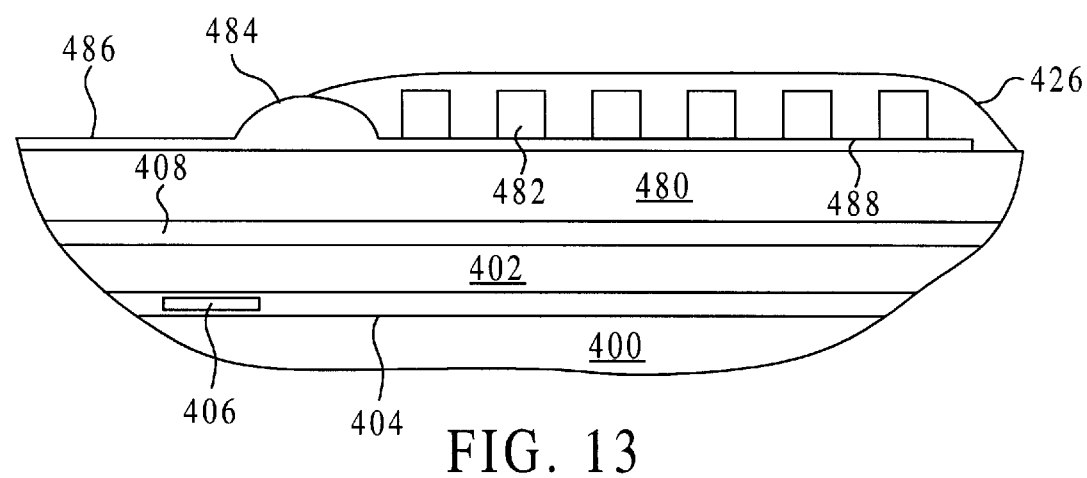
FIG. 13 is a step in making another embodiment of the present invention having an inorganic nonferromagnetic apex region.

FIG. 13 shows an embodiment in which an inorganic nonferromagnetic dielectric layer has been formed on a first pole layer 480, covered with a transfer mask, and etched to form an inorganic nonferromagnetic apex region 484 as well as a submicron gap layer 486. A portion of the icron gap layer extends to separate first pole layer from coil sections 482. Hardbaked photoresist 488 has been formed between and atop coil sections 482 in this example.

Although we have focused on teaching the preferred embodiments of an improved electromagnetic transducer, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

What is claimed is:

1. A head for reading or writing information on a media, the head comprising:

a solid body having a leading end, a trailing end, and a media-facing surface;

a magnetic core disposed in said body, said core including first and second soft magnetic pole layers magnetically coupled to each other in a region adjacent to said media-facing surface, said second pole layer disposed closer than said first pole layer to said trailing end;

a submicron nonferromagnetic gap layer disposed between said first and second pole layers adjacent to said media-facing surface;

an electrically conductive coil layer disposed substantially in a plane and having at least one coil section disposed adjacent to and electrically isolated from said first and second pole layers, with photoresist adjoining said coil section; and an inorganic, nonferromagnetic apex region disposed between said first and second pole layers, aligned with said plane and disposed between said coil section and said media-facing surface, and adjoining said gap layer, said apex region having a thickness that is smallest adjacent to said media-facing surface and increasing with distance from said media-facing surface, said apex region having a trailing surface that increases in distance from said leading end with an increase in distance from said media-facing surface.

2. The head of claim 1, wherein said body includes a wafer substrate portion and a layer of silicon dioxide adjoining said wafer substrate portion, said layer of silicon dioxide disposed between said core and said wafer substrate portion.

3. The head of claim 1, further comprising a magnetic field sensor disposed in said body adjacent to a wafer substrate portion, with a soft magnetic shield layer disposed in said body between said sensor and said wafer substrate portion, said shield layer being affixed to said wafer substrate portion with a layer of silicon dioxide.

4. The head of claim 1, wherein said coil section adjoins inorganic dielectric material.

5. The head of claim 1, wherein said apex region is made of an electrically conductive material.

6. The head of claim 1, wherein said apex region is made of a dielectric material.

7. The head of claim 1, wherein said apex region is separated from said first pole layer by said gap layer.

8. The head of claim 1, wherein said apex region is separated from said second pole layer by said gap layer.

9. A head for reading or writing information on a media, the head comprising:

a solid body having a leading end, a trailing end, and a media-facing surface, said body including a substrate portion;

first and second soft magnetic shield layers, said first shield layer separated from said substrate portion by a first layer of silicon dioxide, said second shield layer extending a first distance in a direction substantially perpendicular to said media-facing surface;

a magnetic field sensor disposed between said shield layers;

first and second soft magnetic pole layers separated from each other by a submicron, nonferromagnetic gap layer, said first and second pole layers magnetically coupled across said gap layer, said first pole layer separated from said second shield layer by a second layer of silicon dioxide, said first pole layer extending in a plane a second distance in said direction substantially perpendicular to said media-facing surface, said second distance being at least twice said first distance;

an electrically conductive coil disposed in said body and including at least one coil section disposed adjacent to and electrically isolated from said first and second pole layers; and an electrically conductive nonferromagnetic apex region disposed between said first and second pole layers to decrease said magnetic coupling as said pole layers extend from said media-facing surface, said apex region having a trailing surface that is not parallel to and not perpendicular to said media-facing surface.

10. The head of claim 9, further comprising:

inorganic dielectric material adjoining said coil section distal to said first pole layer.

11. The head of claim 9, further comprising:

hardbaked photoresist material disposed adjacent said coil section.

12. The head of claim 9, further comprising:

said coil has a plurality of layers and each of said layers has a plurality of coil sections.

13. A head for reading or writing information on a media, the head comprising:

a solid body having a leading end, a trailing end, and a media-facing surface, said body including a substrate portion;

a magnetic core disposed in said body, said core including first and second soft magnetic pole layers magnetically coupled to each other as first and second pole tips in a region adjacent to said media-facing surface, said second pole layer disposed closer than said first pole layer to said trailing end;

a submicron nonferromagnetic gap layer disposed between said pole tips;

an electrically conductive coil disposed in a plane and having at least one coil section disposed adjacent to and electrically isolated from said first and second pole layers; and means for reducing protrusion of said pole tips from said media-facing surface, said means including:

constraining thermal expansion of organic material adjoining said coil section with an inorganic nonferromagnetic apex region aligned with said plane and adjoining said gap layer between said pole layers, and disposing silicon dioxide between said core and said substrate.

14. The head of claim 13, wherein:

said material adjoining said coil section includes hardbaked photoresist.

15. The head of claim 13, wherein:

said coil includes a plurality of coil layers each having plural coil sections, and inorganic dielectric material adjoins said coil sections.

16. The head of claim 13, further comprising:

a magnetoresistive sensor disposed between said substrate and said core, wherein a first silicon dioxide layer is disposed between said substrate and said sensor, and a second silicon dioxide layer is disposed between said sensor and said core.

* * * * *